United States Patent
Lemmer et al.

(10) Patent No.: US 10,432,729 B2
(45) Date of Patent: Oct. 1, 2019

(54) AUTONOMOUS TEAM FORMATION AND TASK NEGOTIATION AMONG UNMANNED VEHICLES

(71) Applicant: Southwest Research Institute, San Antonio, TX (US)

(72) Inventors: Stephan J. Lemmer, San Antonio, TX (US); Cameron R. Mott, San Antonio, TX (US); Paul A. Avery, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 421 days.

(21) Appl. No.: 15/289,831

(22) Filed: Oct. 10, 2016

(65) Prior Publication Data

US 2018/0101171 A1 Apr. 12, 2018

(51) Int. Cl.
| | | |
|---|---|---|
| G05D 1/00 | (2006.01) | |
| G08G 7/00 | (2006.01) | |
| G06F 17/11 | (2006.01) | |
| H04L 29/08 | (2006.01) | |
| G08G 1/00 | (2006.01) | |
| G08G 3/02 | (2006.01) | |
| G08G 5/00 | (2006.01) | |
| H04W 4/46 | (2018.01) | |

(52) U.S. Cl.
CPC .............. H04L 67/12 (2013.01); G08G 1/22 (2013.01); G08G 3/02 (2013.01); G08G 5/0069 (2013.01); H04W 4/46 (2018.02)

(58) Field of Classification Search
CPC ....... H04L 67/12; H04W 4/46; G08G 5/0069; G08G 3/02; G08G 1/22
See application file for complete search history.

(56) References Cited

U.S. PATENT DOCUMENTS

| | | | | |
|---|---|---|---|---|
| 9,043,021 B1 * | 5/2015 | Clark | .................. | G06F 16/2365 700/248 |
| 2007/0021880 A1 * | 1/2007 | Appleby | .............. | G05D 1/0088 701/23 |
| 2014/0025288 A1 * | 1/2014 | Kindel | .................. | G01C 21/26 701/409 |
| 2016/0313742 A1 * | 10/2016 | Wang | .................. | G05D 1/0669 |

* cited by examiner

*Primary Examiner* — Anne M Antonucci
(74) *Attorney, Agent, or Firm* — Livingston Law Firm

(57) ABSTRACT

A system of autonomous vehicles for forming a team of autonomous vehicles to perform a designated set of tasks. Each vehicle stores data representing its own capabilities that match the tasks, data representing needed capabilities for the team to perform the tasks, and data representing the capabilities of all current team members. Each of the vehicles is equipped with a communications system operable to send and receive join request messages and join response messages. All join request message contain the capabilities of the sending vehicle. All join response messages contain current team capabilities data. Upon receipt of a join request message, a vehicle compares needed capabilities data to the received capabilities data, and if there are matched capabilities, it updates the team capabilities data and transmits a join response message. Upon receipt of a join response message, if the message indicates the sending vehicle has joined the team, the receiving vehicle updates the team capabilities list.

12 Claims, 5 Drawing Sheets

| CAPABILITIES: | UXV1 | UXV2 | UXV3 | UXV4 |
|---|---|---|---|---|
| 1. SENSE OBJECTS | ✓ | ✓ | ✓ | ✓ |
| 2. OBSERVER CHANGE | ✓ | ☐ | ☐ | ☐ |
| 3. TRAVEL OFF-ROAD | ☐ | ☐ | ✓ | ✓ |
| 4. REFUEL | ✓ | ✓ | ✓ | ☐ |
| 5 IDENTIFY OBJECTS | ☐ | ☐ | ✓ | ✓ |

| GOAL-SEARCH, OBSERVE, IDENTIFY AND REFUEL ||||||| 
|---|---|---|---|---|---|---|
| TASKS LIST | \multicolumn{5}{c}{CAPABILITIES} | PRIORITY | TRIGGER |
| | 1 | 2 | 3 | 4 | 5 | | |
| SEARCH | ✓ | | | | | 36 | A |
| OBSERVE | | ✓ | | | | 29 | B |
| IDENTIFY | | | | | ✓ | 67 | C |
| REFUEL | | | | ✓ | | 82 | D |

| MATCHED CAPABILITIES: | UXV1 | UXV2 | UXV3 | UXV4 |
|---|---|---|---|---|
| SEARCH | ✓ | ✓ | ✓ | ✓ |
| OBSERVE | ✓ | ☐ | ☐ | ☐ |
| IDENTIFY | ☐ | ☐ | ☐ | ✓ |
| REFUEL | ✓ | ✓ | ✓ | ☐ |

FIG. 3

AUTONOMOUS TEAM FORMATION AND TASK NEGOTIATION AMONG UNMANNED VEHICLES

TECHNICAL FIELD OF THE INVENTION

This invention relates to autonomous unmanned vehicles, and more specifically to such vehicles that cooperate to form teams and negotiate performance of tasks.

BACKGROUND OF THE INVENTION

Unmanned vehicles are increasingly also "autonomous", meaning that the unmanned vehicle has an on-board control system that allows it to perform its mission independently of a human operator. Individual vehicle autonomy is advancing rapidly with regard to capabilities in perception, localization, and navigation.

As unmanned vehicles have improved in their capabilities, so have the variety and complexity of the tasks for which they may be used. However, there are many situations in which a single vehicle cannot meet all the requirements to accomplish a goal.

One approach to accomplishing more complex goals is to use teams of vehicles, among which tasks required to accomplish the goal are distributed. For example, the vehicles may divide tasks among themselves geographically. Or, some vehicles may have capabilities lacking in others, but all cooperate to perform the task. These autonomous vehicle systems can be enabled with communications capabilities that allow each vehicle to extend its perception horizon to include that of other vehicles.

Cooperation among a number of autonomous vehicles is an active field of research. Conventional systems do not tend to easily integrate additional vehicles of the same or other types, to effectively use vehicles with varying levels of capability to perform a task, or adjust to changing conditions such as the loss of a vehicle.

To overcome these shortcomings, conventional systems are also characterized by the need for a highly trained human operator within the communication range of each vehicle. This limits the area of operation to the communications range of the human operator's station, introduces additional latency due to human reaction time, and creates a single point of failure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates how tasks are mapped to vehicle capabilities.

DETAILED DESCRIPTION OF THE INVENTION

The following description is directed to a system of autonomous vehicles in which each vehicle negotiates its own role within a team of vehicles. The team is formed to accomplish a specified goal, which has an expected set of required capabilities. Each vehicle negotiates its team membership based on its own capabilities and the needs of the team, and does so without supervisory control or human intervention.

In the evolving parlance of autonomous vehicles, unmanned ground vehicles and unmanned aerial vehicles are referred to as ground vehicles (UGV's) and aerial vehicles (UAV's), respectively. In a system that uses both ground and aerial vehicles (or water vehicles), the vehicles may be more generally referred to as "UXV's".

Autonomous vehicles may also be referred to as "agents", and multi-vehicle systems as "multi-agent" systems. The terms "vehicle" and "agent" are used herein synonymously to mean any one of various types of UXVs.

For purposes of this description, it is assumed that a team of UXV's (agents) is to be formed to complete a certain goal. It is further assumed that each UXV has appropriate on-board processing (hardware and software) programmed to perform the processes described herein, as well as communications hardware for exchanging messages wirelessly.

Figure 1:
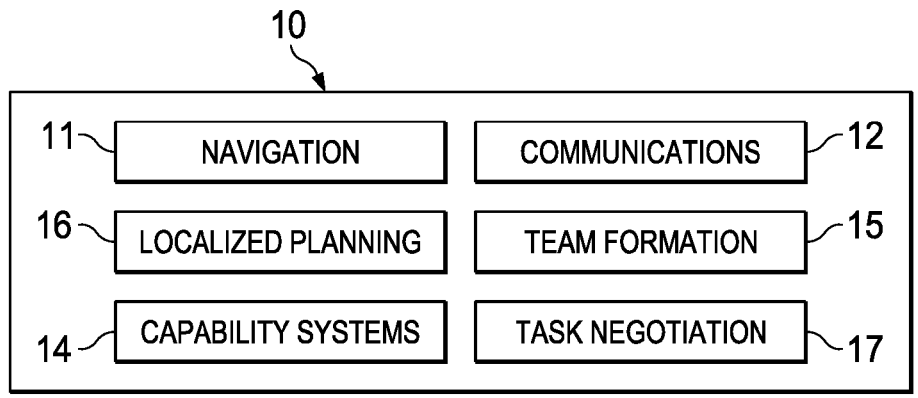
FIG. 1 illustrates the various on-board systems of an unmanned vehicle, a number of which are used to form teams and negotiate task performance in accordance with the invention.

FIG. 1 illustrates a UXV 10, having various on-board systems and processes. A number of such vehicles form teams and negotiate tasks as described herein. Each vehicle is assumed to have all necessary mechanical equipment and processing hardware and software to perform the method described herein.

Each vehicle has a navigation system 11, including mobility mechanisms, which allows it to travel in a self-determined path. Different vehicles may have different mobility modes, such as ground, air or water. Various navigational and mobility systems for unmanned vehicles are known in the various fields of art.

Each vehicle further has a communications system 12 that allows it to send and receive messages to other vehicles, as described herein.

Each vehicle further has one or more "capabilities systems" 14, which is a general term for systems that enable a vehicle to perform specific tasks. For example, a vehicle may have a robotic manipulator, which provides the vehicle with capabilities such as picking up and manipulating objects. As another example, a vehicle may have one or more sensors that detect information about the environment within the sensor(s) field of view. This may be visual information, or other information, such as temperature, pressure, or the like. Examples of suitable perception sensors are digital imaging cameras (visual, infrared or ultraviolet), as well as sensors for thermal imaging or ranging sensors, such as radar, sonar, or lidar. Each vehicle may have the same or different sensors as other vehicles. The types of perception sensors that a vehicle carries on-board may be related to its task performing capabilities.

The vehicle's team formation, localized planning, and task negotiation systems are discussed below.

Figure 2:
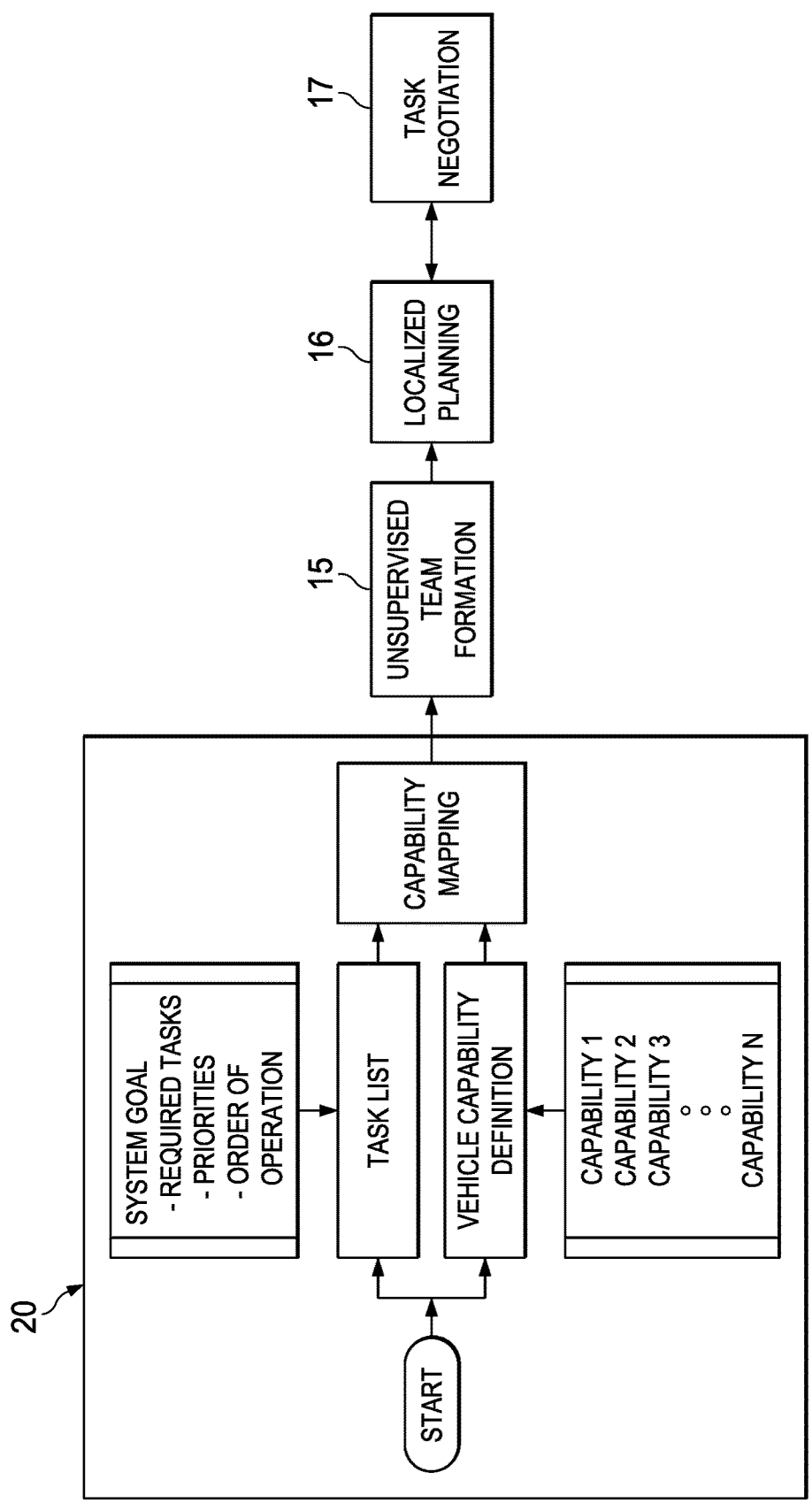
FIG. 2 illustrates preliminary steps to team formation and task negotiation.

Preliminary Definition of Goal and its Tasks, Vehicle Capabilities, and Mapping of Capabilities to Tasks FIG. 2 illustrates a preliminary process 20 that occurs prior to the processing performed by the team negotiation, localized planning and task negotiation systems of each vehicle and prior to performance of tasks by the vehicles' capabilities systems. Although these preliminary steps may occur without human supervision using specialized algorithms, they may also be performed manually.

Once a goal is specified, the goal is defined in terms of individual tasks that may be required to satisfy the goal. This "task list" is then used to identify specific capabilities that are required to perform the tasks.

In addition, each individual agent has a defined list of its own on-board capabilities. As discussed above, each vehicle has one or more capability systems 14 that allow it to perform tasks.

Next, the capabilities required for completion of tasks are mapped to the individual agents' capabilities. As an example of mapping between capabilities required to perform a task and the capabilities of agents, a task may require a vehicle to search for a certain object within an environment, and upon detection to communicate a characteristic of the object (such as its size or position).

FIG. 3 illustrates the capability mapping process of FIG. 2 in further detail. In the example of FIG. 3, the autonomous vehicle system has four vehicles, UXV1-UXV4. Below each vehicle is listed with its capability systems. Some capability systems may be common to other vehicles and some may be unique to that vehicle.

This example autonomous system is tasked with finding objects of a specific type, and then refueling them. This top-level goal is separated into its constituent tasks:

"Search" Find (search and detect) objects with specific characteristics, which may include size, shape, color, heat signature, etc.

"Observe" Track the found object and monitor changes in any relevant characteristics over time.

"Identify" Classify object based on detected characteristics and observations made over time.

"Refuel" Engage with the object for the purpose of adding fuel to its reserves.

In this example, all four UXV's have a capability system (indicated by the checkmark) that maps to a capability required for the "Search" task, although some vehicles may perform the "Search" task with higher confidence depending on its capability system. Only UXV1 is capable of performing the "Observe" task. UXV3 and UXV4 are capable of performing the "Identify" task. UXV1, UXV2, and UXV3 can perform "Refuel".

Thus, as illustrated, for team formation, it is assumed that two or more UXVs each have a set of "matched capabilities", that is, its own capabilities that are matched to the tasks of the goal. Each UXV stores this set of matched capabilities in its on-board memory. It is possible that some UXVs of a potential team will have no matched capabilities. As explained below in connection with FIG. 4, only UXVs with matched capabilities will send "join request" messages to other potential team members.

One aspect of the above example is that no single vehicle type needs to be capable to perform every required task. Thus, when these vehicles perform the team formation process described below, their individual lists of matched capabilities are compared against the overall team's capability requirements.

Cooperative Communications for Team Formation

Once the above-described preliminary activities are complete, the agents are ready to communicate with each other to negotiate team membership.

A message structure and communication protocol facilitate team formation. Using a special communications process, agents exchange information regarding their individual lists of capabilities, and analyze lists received from other agents to determine their role, if any, in a forming or existing team.

Figure 4A:
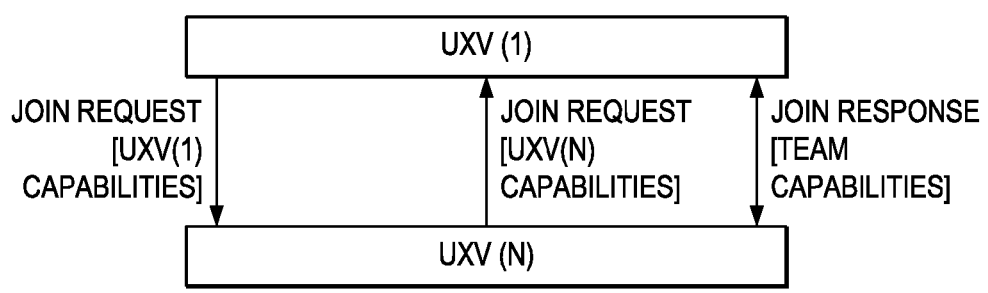
FIG. 4A illustrates the flow of join request and join response messages between two of many vehicles that may potentially join a team.
Figure 4:
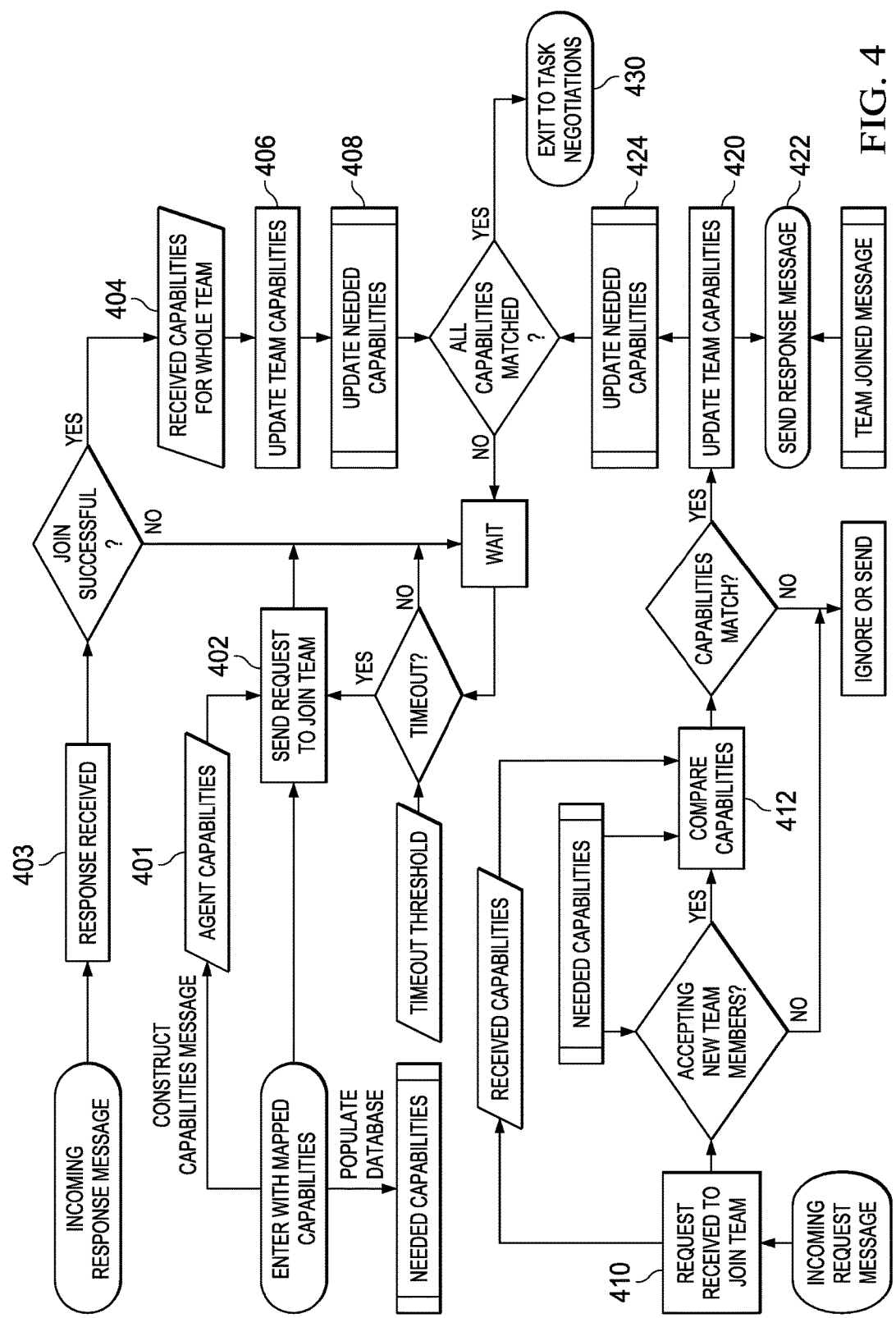
FIG. 4 illustrates the team formation process.

FIG. 4 illustrates how an agent exchanges messages with other agents to form a team. Thus, FIG. 4 is from the viewpoint of a single UXV, and each UXV performs a similar process.

As indicated in Step 401, each agent stores data representing its matched capabilities. As explained above, these are capabilities that the agent has, implemented by its capabilities system(s) 14, that can be used to accomplish the tasks of the goal.

As explained below, each agent further stores needed capability data, which represents capabilities needed to perform the tasks, as well as team capabilities data, which represents the capabilities of all vehicles who have joined the team. This data is updated during the team formation process, such as in Steps 406, 408, 420, and 424.

In Step 402, the agent periodically sends out a request to other agents within communication range to join a team. This message contains a data element that identifies it as a "join team" request, and includes the data representing the sending agent's matched capabilities. Thus, an agent will only send out a "join team" request if it has at least one capability that matches capabilities needed for the goal.

The agent may join with other agents to form a partial or full team through two different incoming message paths. That is, team formation may be realized by any one agent through the receipt of two different incoming messages.

The first path to team formation is if another agent responds to a "join request" message with a "join response" message. In Step 403, the agent receives this message. The message contains data to identify the intended recipient, which is the original sender of the "join request" message.

In Step 404, if the join response indicates a successful join, the agent receives data identifying each of the agents currently in the team, as well as those agents' capabilities. In Step 406, the team capabilities data is updated. Thus, an agent joining an existing team becomes aware of the capabilities of every other team member, and the newly-joined agent's capabilities are also shared among existing team members.

The second path to team formation is for an incoming "join request" message. In Step 410, this message is received. As explained above, a "join request" message contains data representing the capabilities of the sending agent. In Step 412, these received capabilities are compared against a list of capabilities that are still needed to form a successful team. If a team can support multiple agents with overlapping capabilities, this check would be performed here as well.

If the capabilities offered by the requesting agent match the needed capabilities, in Step 420, the new capabilities are added to the list of team capabilities. In Step 422, a "join response" message is sent, which includes data representing all known team member capabilities.

After both Steps 406 and 420, in Steps 408 and 424, respectively, the agent compares the team capabilities to a stored set of capabilities needed to complete the team. A team is not considered as formed until the team has at least one team member that can perform each task. Thus, if all needed capabilities are not matched by a capability of at least one team member, the team formation process may return to Step 402, and another team request message may be sent.

In Step 430, if all needed capabilities are provided by at least one team member, the autonomous team continues to the task negotiation process.

FIG. 4A illustrates the flow of join request and join response messages between two of many vehicles that may potentially join a team. The vehicles are identified as UXV (1) and UXV(N). Each join request message contains the capabilities of the sender. Each join response message contains updated team capabilities.

Task Negotiation Among Team Members

As indicated in Step 430 of FIG. 4, once a team of vehicles is formed, the team begins to negotiate performance of the tasks needed to complete the team goal.

A localized planning process 17 solves the problem of the single vehicle optimizing its path within a large number of tasks. Various known task planning approaches may be used and modified.

For example, the localized planning process 17 may be viewed as a modification of the well-studied "traveling salesman problem," which states: "Given a list of cities and the distances between each pair of cities, what is the shortest possible route that visits each city exactly once, then returns to the origin city?"

The traveling salesman implementation of the present invention differs from the canonical traveling salesman problem in that the cities are replaced with tasks which must be performed. Also, the implementation seeks to maximize a score function, and it allows tasks to become available or unavailable based on time and other tasks that have been completed.

Each task receives a score when it is visited, whose calculation is described in the first equation below where "s" is a score value from 0-1 and "w" is weight factor, also from 0-1. This value is then used in the calculation of the score function, shown in the second equation. In this formula, "s" is the score of a task, from 0-1, and "d" is a "decay" value, which reduces the value of a task based on the capabilities of other vehicles, also from 0-1. An example decay formula is given in the third equation, where "n" is the number of teammates that are capable of performing the task, and "L" is the number of tasks already in the local vehicle's plan. This prioritizes specialized tasks early, but makes less specialized tasks more appealing as time goes on and they remain unclaimed.

$$s_{task} = \frac{s_{priority}w_{priority} + s_{time}w_{time} + s_{confidence}w_{confidence} + s_{resource}w_{resource}}{w_{priority} + w_{time} + w_{confidence} + w_{resource}}$$ Equation 1

$$s_{total} = \sum s_{task} d_{task}$$ Equation 2

$$d_{task} = e^{-2n_{capable} + \frac{1}{L_{path}}}$$ Equation 3

Given the above requirements, one approach to localized planning extends the well-studied "Ant Colony System" solver.

Figure 5:
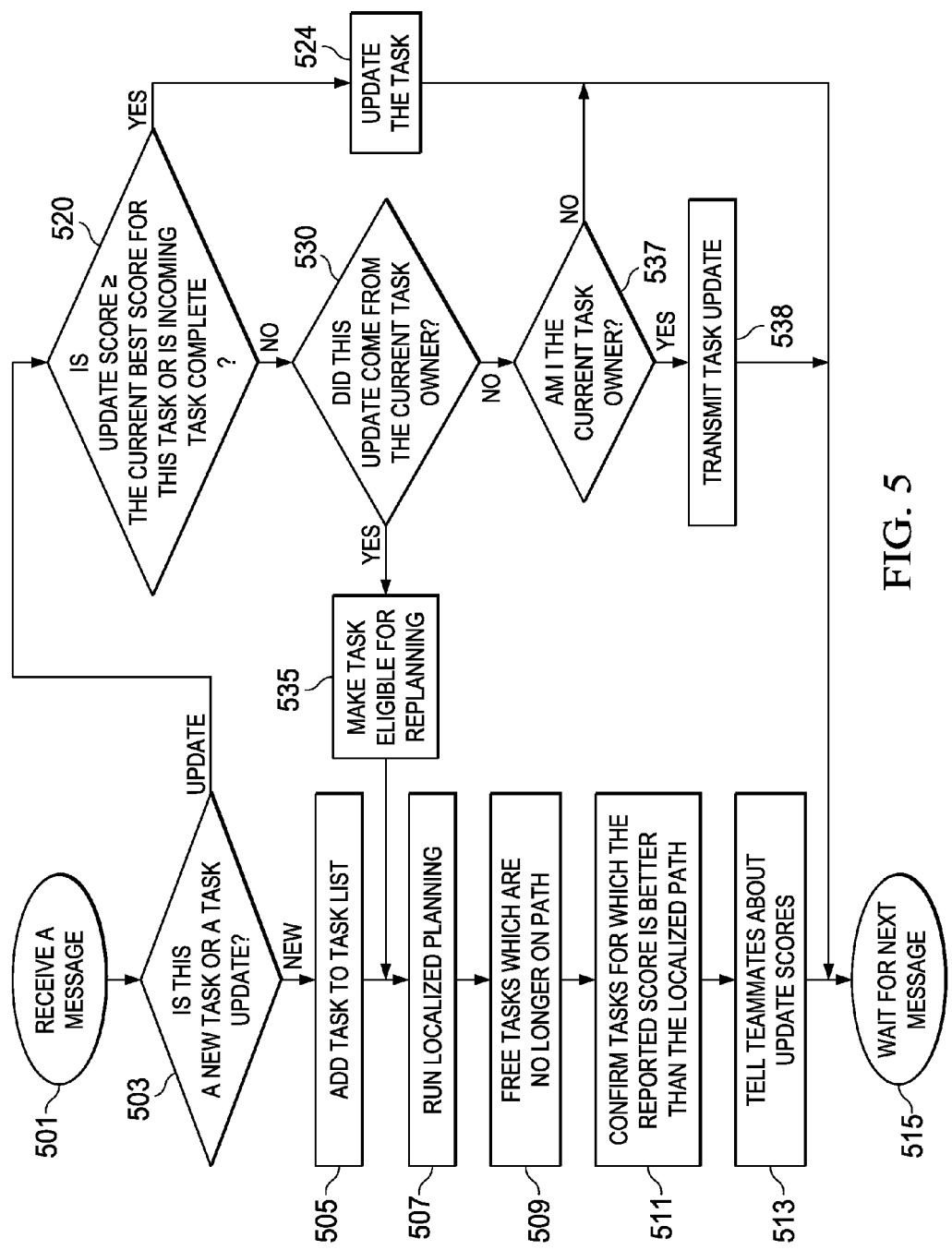
FIG. 5 illustrates the task negotiation process.

FIG. 5 illustrates the task negotiation process 17 from the viewpoint of an individual agent. As illustrated, task negotiation among vehicles is implemented in each vehicle as an event-driven decision tree. The task negotiation process responds to messages received from external sources, such as other vehicles' task claims, or new tasks that have been created.

Each vehicle's task negotiation process 17 interacts with its localized planning process 16 to determine if the vehicle's local path needs to be re-planned, whether or not the vehicle should perform the task, and what information should be shared with other vehicles.

A feature of the task negotiation process 17 is that it may execute independently of team formation or high level goals. The process considers a list of tasks, regardless of whether the list originates from a human operator, from another autonomous vehicle, or from the team formation process described above.

For purposes of this example, it is assumed that the task negotiation process of FIG. 5 begins at the end of team formation, as indicated by Step 430 of FIG. 4. Each vehicle is assumed to have a stored "task list" representing tasks to be performed by the team.

Task negotiation begins at Step 501 with receipt of a "task message". This message consists of data containing information required to implement the cost function (Equation 1 above), which can vary depending on the information available and the requirements set forth by the designer, as well as information about the task's anticipated completion.

As an example, a task message may contain the following data: 1) Location of the sending agent. In practice, location is likely to be latitude and longitude. 2) A unique task ID (identifier). 3) A task type. 4) Task priority. 5) Relative importance ("weight") of priority, time, confidence, and resource cost. 6) Identification of the agent laying claim to the task. 7) The expected score with which the claiming agent will perform the task. 8) The expected time at which the agent will complete the task.

In Step 503, the receiving agent determines if the task identified in the task message is "new", or alternatively, whether it is a task update. A task is considered "new" if the task ID has not been received previously by the receiving vehicle.

Steps 505-513 are performed if the task is new. In Step 505, the task is added to the task list. In Step 507, the vehicle then executes its localized planning process, as described above, to generate a task performance path.

In Step 509, any task that is no longer on that vehicle's path is freed from being claimed by that vehicle. Thus, if a task is no longer on the path, the next outgoing task message will let the rest of the team know.

Step 511 is performed by comparing reported task scores (as received in task messages) to the local vehicle's score for its localized path. If a higher score is achieved on the localized path, the task score is updated. If a task previously claimed by the local vehicle now has a lower score, the task score is also updated.

Thus, in Step 513, the vehicle delivers a task message with any updated task scores. In this manner, if a task score has been improved or degraded, the rest of the team is informed and can plan accordingly.

The vehicle then defaults to Step 515, which is waiting for the next task message.

Referring again to Step 503, if the task message indicates that the task is a task update, Step 520 is comparing the task score to stored task scores on the task list. It is also determined whether the task in the incoming task message has been completed.

Step 524 is performed if the update score is greater than the current score or if the task has been completed. The task is then updated in that vehicle's stored task list. The vehicle then defaults to Step 515, and awaits the next task message.

As a result of Step 524, if a vehicle attempts to claim a task that is better performed by another vehicle, it is corrected by the vehicle that already claimed the task, without running the localized planning process. A "confirmed" flag is an agent's internal reference for whether or not it recognizes another vehicle's ownership of the task, which indicates whether or not the local vehicle's route may include this task. If the task was confirmed previously (i.e., a vehicle acknowledges that it cannot perform the task better), then an increase in score is confirmed by default. Localized planning may be run again if the task was previously unconfirmed.

Steps 530-538 are performed if the update score is less than the receiving vehicle's current score for the task. In Step 530, it is determined whether the update score was received from the current task owner.

If the update score was received from the current task owner, this means that the vehicle currently considered the owner of the task has indicated that its anticipated performance has degraded. This indicates that it may no longer be the best performer of a task. Thus, in Step 535, the task is assigned re-planning eligibility, and Step 507 (localized planning) is performed.

If the update did not come from the current task owner, in Step 537, the vehicle determines if it is the task owner. If so, it transmits a "correction" task message with the current task score. If not, the vehicle defaults to Step 515 and waits for the next task message.

The task negotiation process further involves task confirmation and re-running of the localized planning process. If localized planning has confirmed another vehicle's assessment of a task, there is one fewer task eligible for localized planning. Instead of simply not including that task in the vehicle's plan, the plan is completely recalculated without the confirmed task to optimality. Further, only the task showing the largest difference between the local vehicle's plan and the current best score is confirmed before the path is replanned, which ensures that tasks are removed from eligibility one at a time.

The above-described task negotiation method generates a plan for each UXV to independently execute a series of tasks, and these plans are generated in a way that optimizes the cooperative system-level execution of all tasks. This capability scales from the simple routing problems with identical vehicles and tasks, to complex problems with many different tasks and vehicles.

What is claimed is:

1. A system of autonomous vehicles for forming a team of autonomous vehicles to perform a designated set of tasks:
   a first autonomous vehicle having a processing system for storing a first set of agent capability data representing those of the tasks that the first autonomous vehicle is able to perform;
   a second autonomous vehicle having a processing system for storing a second set of agent capability data representing those of the tasks that the second autonomous vehicle is able to perform;
   one or more additional autonomous vehicles each having a processing system for storing an additional set of agent capability data representing those of the tasks that the additional autonomous vehicle is able to perform;
   wherein each autonomous vehicle, after acceptance into the team, further stores needed capability data representing capabilities needed to perform the designated set of tasks, and further stores team capability data representing the capabilities of all vehicles who have joined the team;
   wherein each of the autonomous vehicles is equipped with a communications system operable to send and receive at least the following types of messages: join request messages and join response messages; wherein each join request message contains received agent capabilities data representing the sending vehicle's capabilities; wherein each join response message contains team capabilities data representing the capabilities of all current team members;
   wherein each of the autonomous vehicles is programmed, upon receipt of a join request message, to compare the needed capabilities data to the received capabilities data, thereby determining if there are matched capabilities, and if there are matched capabilities, to update the team capabilities data and to transmit a join response message;
   wherein each of the autonomous vehicles is programmed, upon receipt of a join response message from a sending vehicle, if the message indicates the sending vehicle has joined the team, to update the team capabilities data; and
   a new team member comprising a newly accepted autonomous vehicle that has been accepted into the team in response to a join request when no other autonomous vehicle and no other control process shad prior stored capabilities data representing capabilities of the newly accepted autonomous vehicle.

2. The system of claim 1, wherein each of the first set of capabilities, the second set of capabilities, and the additional set of capabilities each comprise at least one unique capability.

3. The system of claim 1, wherein each of the first set of capabilities, the second set of capabilities, and the additional set of capabilities each comprise at least one overlapping capability.

4. The system of claim 1, wherein at least one agent has a perception sensor capability.

5. The system of claim 1, wherein at least one agent has a robotic manipulation capability.

6. The system of claim 1, wherein each agent is equipped with a navigation system.

7. A method of forming a team of autonomous vehicles to perform a designated set of tasks:
   providing each of a number of autonomous vehicles with a processing system for storing an additional set of agent capability data representing those of the tasks that the additional autonomous vehicle is able to perform;
   wherein each autonomous vehicle, after acceptance into the team, further stores needed capability data representing capabilities needed to perform the designated set of tasks, and further stores team capability data representing the capabilities of all vehicles who have joined the team;
   providing each autonomous vehicle with a communications system operable to send and receive at least the following types of messages: join request messages and join response messages; wherein each join request message contains received agent capabilities data representing the sending vehicle's capabilities; wherein each join response message contains team capabilities data representing the capabilities of all current team members;
   wherein each of the autonomous vehicles is programmed, upon receipt of a join request message, to compare the needed capabilities data to the received capabilities data, thereby determining if there are matched capabilities, and if there are matched capabilities, to update the team capabilities data and to transmit a join response message;

wherein each of the autonomous vehicles is programmed, upon receipt of a join response message from a sending vehicle, if the message indicates the sending vehicle has joined the team, to update the team capabilities data; and accepting a new team member as a newly accepted autonomous vehicle that has been accepted into the team in response to a join request when no other autonomous vehicle and no other control process had prior stored capabilities data representing capabilities of the newly accepted autonomous vehicle.

8. The method of claim 7, wherein each of the first set of capabilities, the second set of capabilities, and the additional set of capabilities each comprise at least one unique capability.

9. The method of claim 7, wherein each of the first set of capabilities, the second set of capabilities, and the additional set of capabilities each comprise at least one overlapping capability.

10. The method of claim 7, wherein at least one agent has a perception sensor capability.

11. The method of claim 7, wherein at least one agent has a robotic manipulation capability.

12. The method of claim 7, wherein each agent is equipped with a navigation system.

\* \* \* \* \*